(12) United States Patent
Lehr

(10) Patent No.: US 12,253,405 B2
(45) Date of Patent: Mar. 18, 2025

(54) WEIGHING OF ANIMALS

(71) Applicant: Farm Robotics and Automation SL, Vilanova i la Geltru (ES)

(72) Inventor: Heiner Lehr, Vilanova i la Geltru (ES)

(73) Assignee: Farm Robotics and Automation SL, Vilanova i la Geltru (ES)

( * ) Notice: Subject to any disclaimer, the term of this patent is extended or adjusted under 35 U.S.C. 154(b) by 332 days.

(21) Appl. No.: 17/759,656

(22) PCT Filed: Jan. 25, 2021

(86) PCT No.: PCT/EP2021/051618
§ 371 (c)(1),
(2) Date: Jul. 28, 2022

(87) PCT Pub. No.: WO2021/151837
PCT Pub. Date: Aug. 5, 2021

(65) Prior Publication Data
US 2023/0054534 A1    Feb. 23, 2023

(30) Foreign Application Priority Data
Jan. 31, 2020 (EP) ..................... 20154997

(51) Int. Cl.
*G01G 17/08*    (2006.01)
*A01K 29/00*    (2006.01)

(52) U.S. Cl.
CPC ............. *G01G 17/08* (2013.01); *A01K 29/00* (2013.01)

(58) Field of Classification Search
CPC ................ G01G 17/08; A01K 29/00
(Continued)

(56) References Cited

U.S. PATENT DOCUMENTS

| | | | | |
|---|---|---|---|---|
| 4,470,471 A | * | 9/1984 | Mills ...................... | G01G 21/12 |
| | | | | 177/245 |
| 8,707,908 B2 | * | 4/2014 | Grave .................... | A01K 29/00 |
| | | | | 119/842 |

(Continued)

FOREIGN PATENT DOCUMENTS

| CN | 204115835 U | 1/2015 |
|---|---|---|
| CN | 108344480 A | 7/2018 |

(Continued)

OTHER PUBLICATIONS

European Patent Office, International Search Report related to International Patent Application No. PCT/EP2021/051618, mail date May 17, 2021.

*Primary Examiner* — Jacques M Saint Surin

(57) ABSTRACT

Devices and methods for monitoring the weight of animals in an animal housing facility including a support surface configured so that at least one of the animals can stand on the support surface, a force sensor, attached to the support surface, for measuring a force indicative of a weight of the animal on the support surface, a rail system actuator for suspending the device from a rail or track of a rail system and propelling it along the rail or track, a processor receiving a signal from the force sensor indicative of a weight of the animal or animals on the support surface when the support surface is located at a target position, and determining a weight measurement of an individual animal based on the signal.

21 Claims, 1 Drawing Sheet

(58) Field of Classification Search
USPC .............................................................. 177/1
See application file for complete search history.

(56) References Cited

U.S. PATENT DOCUMENTS

| | | | | |
|---|---|---|---|---|
| 8,797,166 | B2 * | 8/2014 | Triener | .................. G01G 21/22 |
| | | | | 340/573.3 |
| 9,420,766 | B2 * | 8/2016 | Triener | ................ G08B 21/182 |
| 10,104,871 | B2 * | 10/2018 | Triener | .................. A01K 31/12 |
| 2005/0006153 | A1 | 1/2005 | Baarsch et al. | |

FOREIGN PATENT DOCUMENTS

| | | |
|---|---|---|
| EP | 2133672 A1 | 12/2009 |
| GB | 2307054 A1 | 5/1997 |
| WO | 2018015519 A1 | 1/2018 |

* cited by examiner

WEIGHING OF ANIMALS

CROSS-REFERENCE TO RELATED APPLICATION

This application is a national phase entry under 35 U.S.C. § 371 of International Patent Application PCT/EP2021/051618, filed Jan. 25, 2021, designating the United States of America and published in English as International Patent Publication WO 2021/151837 A1 on Aug. 5, 2021, which claims the benefit of and priority from European Patent Application No. 20154997.9, filed Jan. 31, 2020, the entire disclosure of each of which is hereby incorporated by reference.

TECHNICAL FIELD

The present invention relates to the field of raising animals, and particularly to large-scale farming, such as factory farming, of animals, e.g. poultry. The present invention specifically relates to a device and a method for monitoring the weight of animals in an animal housing facility, such as a barn or a coop.

BACKGROUND

In the field of animal farming for meat production, e.g. in poultry farming, e.g. in raising broilers, a need exists for monitoring the weight (mass) of the animals during the animal raising process, i.e. over the production period. Thus, the development and health of the animals can be monitored, e.g. to determine readiness for slaughtering. The weight, or the evolution of the weight, is also an important indicator for discovering diseases in the animal population. When weighing of the animals is performed manually, the efficiency is generally low, the labor intensity is high, and the manual weighing and recording process is prone to human errors.

Many solutions exist in the art for weighing animals in slaughterhouses. For example, the Chinese utility model CN204115835U discloses a live poultry weighing machine for use in a poultry slaughter production line, in which a poultry cage conveyor feeds live poultry to a weight detector for batch weighing poultry. However, such approaches to measure the weight of live animals, or of carcasses, as applied in slaughterhouses are generally not suitable for monitoring the weight of animals, e.g. on a statistical sampling basis, during the fattening process. In the latter context, the weighing method should, preferably, allow the continuous or semi-continuous measurement of the weight of randomly sampled animals, and this with as little disruption as possible of the animal's habitual patterns, e.g. to avoid stress responses.

The United States patent application US2005/006153 discloses an approach for weighing quadruped animals, in which a pen is divided into two segregated spaces. A weighing station is located in a passage between the spaces, in which this station has inlet and exit scales supporting a weighing platform. A controller determines the presence of a single animal, using an iterative process for analyzing the inlet and exit weight signals. However, this approach may be cumbersome and impractical, due to the requirement of partitioning the pen. Furthermore, a high mobility of the animal population needs to be assumed if a good sample of the weight of the overall population is to be acquired.

It is also known in the art to provide poultry weighing devices in a coop, in which a support surface hangs just above the coop floor, e.g. suspended from a ceiling mount or supported by a frame on the floor, such that a force sensor in the support fixing can detect the weight of one or more animals when on the support surface.

GB2307054 discloses an automatic poultry weighing system for monitoring the weight of chickens. In this system, a weighing platform is protected by a tunnel to ensure that only one bird at a time can influence the weighing.

The European patent EP2133672 discloses a poultry scale in which a support surface is provided, on which several birds can be placed. A force sensor is attached to the support surface in such a way that it can detect the weight of the birds on the support surface. An evaluation unit is adapted to compare sudden changes of the force sensor signal with previously stored weight data and to store the weight change as the weight of an individual bird. A second sensor detects a further property of the birds on the support surface, such that the weight and the further measurement can be obtained as correlated measurements. This further property may comprise a color measurement, temperature and/or volume indicators, such as height, length and/or width.

SUMMARY

It is an object of the present invention to provide efficient, good, simple and/or accurate means and methods for determining the weight of animals in an animal housing facility.

It is an advantage of embodiments of the present invention that an automatic and continuous (e.g. at least periodically or frequently) recording of animal weights is provided.

It is an advantage of embodiments of the present invention that animal weights can be determined and recorded frequently and rapidly.

It is an advantage of embodiments of the present invention that an animal weighting device is provided that is simple in structure and/or easy to maintain.

It is an advantage of embodiments of the present invention that animal weights can be determined and recorded accurately.

It is an advantage of embodiments of the present invention that a high efficiency and a low labor intensity can be achieved in weighing animals.

It is an advantage of embodiments of the present invention that the undesirable effects of human errors can be reduced or avoided.

It is an advantage of embodiments of the present invention that means and methods for weighting animals are provided that do not depend heavily on the level of experience and knowledge of a worker, e.g. a poultry farmer.

It is an advantage of embodiments of the present invention that weight statistics of an animal population can be collected efficiently and accurately, such that abnormal development of the animals, e.g. of fowls, as potentially indicative of diseases within the stock, can be detected.

It is an advantage of embodiments of the present invention that the welfare of the animals can be observed by use of, preferably continuous, e.g. periodical or frequent, measurements of the weight of the animals. A continuous screening of the animal population allows for a quick discovery of any anomalies in the shed, such as the beginning of potentially harmful diseases. Malfunctioning equipment, such as equipment for nourishing the animals, may also be quickly detected.

It is an advantage of embodiments of the present invention that an appropriate moment in time can be determined to remove animals for slaughtering from the housing facility.

It is an advantage of embodiments of the present invention that an average slaughter weight can be estimated based on animal weight statistics that are collected by means and/or methods in accordance with embodiments of the present invention.

It is an advantage of embodiments of the present invention that a good sampling of the weight of an animal population housed in a building can be achieved by moving a weighing apparatus through the animal housing facility. For example, mobility of the animals in the housing facility may be too low to ensure a good sampling of the population when the device remains stationary. This can show itself in significant weight differences between animals which congregate at each end of the facility.

The above objective is achieved by a device and method in accordance with embodiments of the present invention.

In a first aspect, the present invention relates to a device for monitoring the weight of animals in an animal housing facility. The animals may be animals that typically weigh less than 20 kg, e.g. less than 17.5 kg, e.g. less than 15 kg, e.g. less than 10 kg, e.g. less than 5 kg. The animals may refer to animals that typically have a volume that is less than 20 $dm^3$, e.g. less than 17.5 $dm^3$, e.g. less than 15 $dm^3$, e.g. less than 10 $dm^3$, e.g. less than 5 $dm^3$. The animals may be poultry. The device comprises a support surface configured so that at least one of the animals can stand on the support surface, in operation of the device. The device comprises a force sensor, connected to or attached to the support surface, for measuring a force indicative of a weight of the animal or animals on the support surface, in operation of the device. The indication of a weight of the animal or animals on the support surface, in operation of the device, can be the change in weight as measured by a force sensor as an animal climbs onto the support surface. The device comprises a rail system actuator for suspending the device from a rail or track of a rail system and to propel the device, when controlled accordingly, along the rail or track when operably attached thereto in operation of the device. Such a rail system is disclosed in for example the international patent application WO2018/015519 which is incorporated by reference in its entirety. The device comprises a processor (which can be part of a controller such as an on-board controller) adapted for:

controlling the rail system actuator to move the actuator to a target position in the animal housing facility, which can be done automatically once the target position is known;

receiving a signal from the force sensor indicative of a weight of the animal or animals on the support surface when the support surface is located at the target position, which can be done automatically; and determining a weight measurement of an individual animal based on said signal which can be done automatically.

In a device in accordance with embodiments of the present invention, the processor (which can be part of the controller such as the on-board controller) may be adapted for receiving the signal by sampling the signal provided by the force sensor at a predetermined sampling frequency which sampling can be done automatically and/or continuously.

In a device in accordance with embodiments of the present invention, the processor (which can be part of the controller such as the on-board controller) may be adapted for analyzing fluctuations of the signal over time and comparing the signal or temporal changes in the signal to a predetermined range of typical forces due to weight of said animals, in which the weight of individual animals is determined on the basis of the signal or the temporal change of the signal when falling within said predetermined range. This can be done automatically.

In embodiments, the device in accordance with the present invention, further comprises a memory, and wherein the processor (which can be part of the controller such as the on-board controller) may be adapted for storing in the memory a plurality of the weight measurements of individual animals. This can be done automatically.

In embodiments, the device in accordance with the present invention, further comprises a communication module, and wherein the processor (which can be part of the controller such as the on-board controller) may be adapted for communicating, using the communication module, the weight measurement of an individual animal or a plurality of such weight measurements to a receiver. This can be done automatically In a device in accordance with embodiments of the present invention, the animals may be poultry.

In a device in accordance with embodiments of the present invention, the support surface may be adapted such that a plurality of the animals can stand simultaneously on the support surface.

In a device in accordance with embodiments of the present invention, the processor (which can be part of the controller such as the on-board controller) may be adapted for controlling the rail system actuator to move at a substantially constant speed through the facility, in which said speed is substantially imperceptible to the animals. This control can be done automatically.

In embodiments, the processor is adapted for controlling the rail system actuator to move at a constant speed through the facility, and wherein the constant speed is a speed in a range of 1 mm per hour to 1 m per hour.

In a device in accordance with embodiments of the present invention, the processor (which can be part of the controller such as the on-board controller) may be adapted for determining the target position to move the rail system actuator to, by receiving instructions and/or coordinates via a communication module and/or by randomly sampling locations in the animal housing facility and/or by periodically moving the rail system actuator to a next position of a predetermined sequence of positions. This can be done automatically A device in accordance with embodiments of the present invention may comprise a lifting actuator for lowering and raising the support surface. This determining of the target position can be done automatically.

In a device in accordance with embodiments of the present invention, the lifting actuator may be adapted for lowering the support surface to a predetermined distance from the ground for performing weight measurements and for raising the support surface to an upper position for travelling through the animal housing facility. These changes can be done automatically.

In a device in accordance with embodiments of the present invention, the lifting actuator may comprise a telescopic arm, a telescopic lift, a scissor lift and/or combinations thereof.

In a device in accordance with embodiments of the present invention, the processor (which can be part of the controller such as the on-board controller) may be adapted for controlling the lifting actuator to raise the support surface before controlling the rail system actuator to move to the target position, and controlling the lifting actuator (4) to lower the support surface (2) after the target position has been reached. This can be done automatically.

A device in accordance with embodiments of the present invention may comprise an animal presence sensor to detect the presence of an animal below the support surface. This detection can be done automatically.

In a device in accordance with embodiments of the present invention, the processor (which can be part of the controller such as the on-board controller) may be adapted to detect the presence, using the animal presence sensor, of an animal below the support surface while lowering the support surface.

In a device in accordance with embodiments of the present invention, the processor (which can be part of the controller such as the on-board controller) may be adapted to, when the presence of an animal is detected, halt the lowering of the lifting actuator until the presence of the animal is no longer detected. This can be done automatically.

In a device in accordance with embodiments of the present invention, the processor (which can be part of the controller such as the on-board controller) may be adapted to, when the presence of an animal is detected, control the rail system actuator to move until the presence of the animal is no longer detected. This can be done automatically.

In a device in accordance with embodiments of the present invention, the processor (which can be part of the controller such as the on-board controller) may be adapted to, when the presence of an animal is detected, control the lifting actuator to move, in case where said lifting actuator is adapted for moving in a direction other than solely the vertical direction, e.g. in a horizontal direction until the presence of the animal is no longer detected. This movement can be carried out automatically.

In a device in accordance with embodiments of the present invention, the processor (which can be part of the controller such as the on-board controller) may be adapted to, when the presence of an animal is detected, activate alerting means to encourage the detected animal to move away from underneath the support surface. This alerting can be done automatically.

In a second aspect, the present invention relates to a method for monitoring the weight of animals in an animal housing facility. This monitoring can be done automatically and/or continuously. The animals may be animals that typically weigh less than 20 kg, e.g. less than 17.5 kg, e.g. less than 15 kg, e.g. less than 10 kg, e.g. less than 5 kg. The animals may refer to animals that typically have a volume that is less than 20 $dm^3$, e.g. less than 17.5 $dm^3$, e.g. less than 15 $dm^3$, e.g. less than 10 $dm^3$, e.g. less than 5 $dm^3$. The animals may be poultry. The method comprises moving a support surface to a target position in the animal housing facility along a rail or track, whereby such a rail system is disclosed in the international patent application WO2018/015519 which is incorporated by reference in its entirety. The support surface is suitable for at least one of the animals to stand on. The method can comprise receiving a signal from a force sensor indicative of a weight of the animal or animals on the support surface when the support surface is located at the target position. The generation of the signal can be done automatically. The method comprises determining a weight measurement of an individual animal based on the signal. This can be done automatically.

In a method in accordance with embodiments of the present invention, the animals may be poultry.

In a method in accordance with embodiments of the present invention, the support surface may be adapted such that a plurality of the animals can stand simultaneously on the support surface.

In a method in accordance with embodiments of the present invention, moving the support surface may comprise moving the support surface at a substantially constant speed through the facility, in which the speed is substantially imperceptible to the animals. Control of speed can be done automatically.

A method in accordance with embodiments of the present invention may comprise determining the target position to move the support surface to, by receiving instructions and/or coordinates, e.g. via a communication module, and/or by randomly sampling locations in the animal housing facility and/or by periodically moving to a next position of a predetermined sequence of positions. This sequence of operations can be done automatically.

A method in accordance with embodiments of the present invention may comprise raising the support surface before moving the support surface to the target position and lowering the support surface when the target position has been reached, e.g. to a predetermined distance d from the ground for performing weight measurements. This can be carried out automatically.

A method in accordance with embodiments of the present invention may comprise detecting the presence of an animal below the support surface. This can be done automatically.

In a method in accordance with embodiments of the present invention, when the presence of the animal is detected, the lowering of the support surface may be halted until the presence of the animal is no longer detected. This can be done automatically.

In a method in accordance with embodiments of the present invention, when the presence of the animal is detected, the support surface may be moved, e.g. in a horizontal direction, out of the way until the presence of the animal is no longer detected. This can be done automatically.

In a method in accordance with embodiments of the present invention, when the presence of the animal is detected, the detected animal may be encouraged to move away from underneath the support surface, e.g. using alerting means. This alert can be done automatically.

In a method in accordance with embodiments of the present invention, receiving the signal may comprise sampling the signal provided by the force sensor at a predetermined sampling frequency. This sampling can be done automatically.

In a method in accordance with embodiments of the present invention, determining the weight measurement may comprise analyzing fluctuations of the signal over time and comparing the signal or temporal changes in the signal to a predetermined range of typical forces due to weight of the animals, in which the weight of individual animals is determined on the basis of the signal or the temporal change of the signal when falling within said predetermined range. This can be done automatically.

A method in accordance with embodiments of the present invention may comprise storing, e.g. in a digital memory which can be a non-volatile memory, a plurality of the weight measurements of individual animals, and/or transmitting, e.g. using a communication module, the weight measurement of an individual animal or a plurality of such weight measurements to a receiver. This can be done automatically.

These and other aspects of the present invention will be apparent from and elucidated with reference to the embodiment(s) described hereinafter.

The independent and dependent claims describe specific and preferred features of the invention. Features of the dependent claims can be combined with features of the

Figure 1:
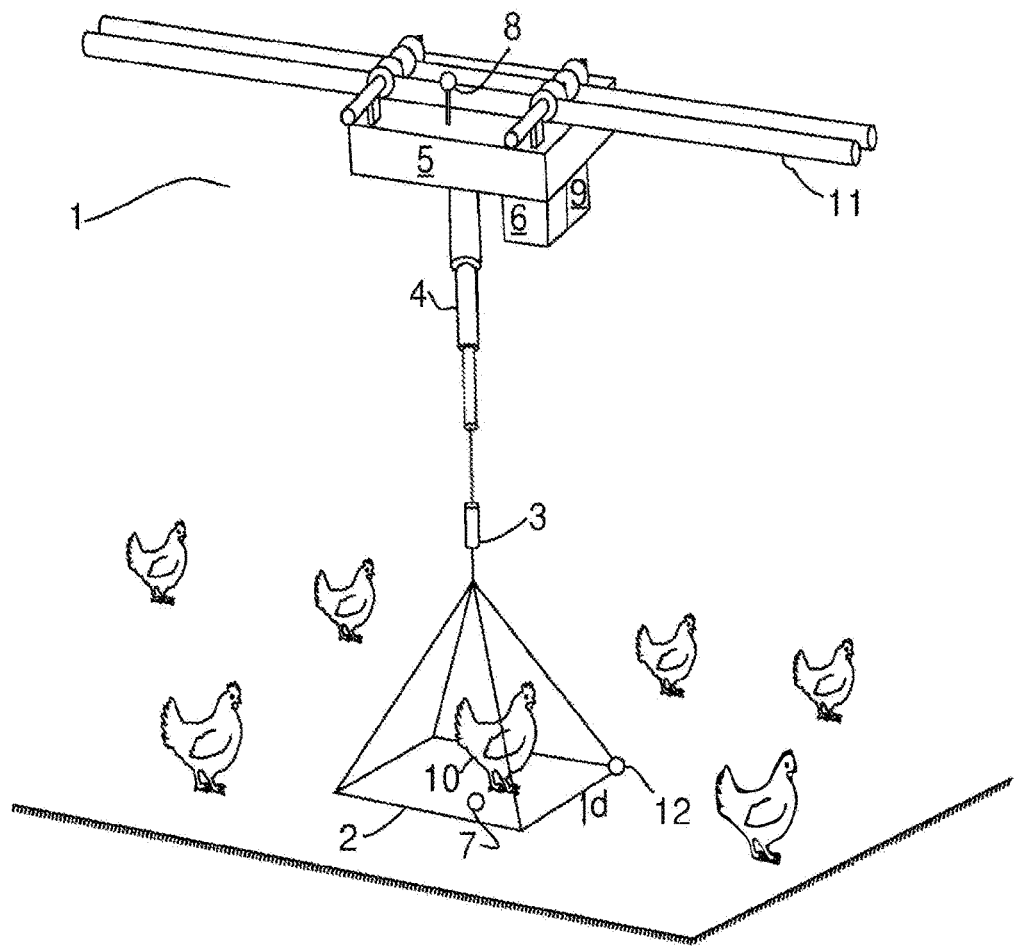
FIG. 1 illustrates a device in accordance with embodiments of the present invention.

The drawings are schematic and non-limiting. Elements in the drawings are not necessarily represented on scale, e.g. an element may be exaggerated for illustrative purposes or reduced in scale to keep the drawing clear and comprehensible. The present invention is not necessarily limited to the specific embodiments of the present invention as shown in the drawings. Reference signs in the claims shall not be construed as limiting the scope. In different drawings, the same reference signs may refer to the same or analogous elements.

Definitions

On-Board Controller

A controller such as an on-board controller is provided with all means to process data digitally, to receive images and/or data, to receive commands and to act upon them, e.g. by providing an output signal, to generate signals that control movements and actions of actuators, manipulators, grippers, motors, etc. The controller does not need to be on-board a robot but in preferred embodiments it is. The controller may be placed in a position from which it can communicate with actuators, manipulators, drives etc, e.g. wirelessly. This could allow computer processing power to be placed outside any areas which may be subject to methane or other materials which could cause corrosion or other damage to electronic equipment.

A controller such as an on-board controller can have several ports with associated input and/or output ports and communication interfaces such as:
- a cable or wireless connection for communication with a local area network (not shown) and/or for communication with a display screen, and/or
- a serial connection such as a USB connection, and may also include a processor, a random access memory, non-volatile memory, input and/or output ports whereby all can be linked by a bus system.

The functions of the controller may be provided by software that has been compiled into a computer program for running on the controller with its processor. The controller may be programmed to carry out these functions automatically without human interference.

DETAILED DESCRIPTION

The present invention is only limited by the attached claims, notwithstanding the exemplary embodiments described hereinbelow. The attached claims are hereby explicitly incorporated in this detailed description, in which each claim, and each combination of claims as allowed for by the dependency structure defined by the claims, forms a separate embodiment of the present invention.

The word "comprise," as used in the claims, is not limited to the features, elements or steps as described thereafter, and does not exclude additional features, elements or steps. This therefore specifies the presence of the mentioned features without excluding a further presence or addition of one or more features.

Ordinal references, such as first, second and the like, in the description and/or in the claims may be used to discern similar elements and do not necessarily define a sequence, either temporally, spatially, in ranking or in any other manner. Such terms may be interchangeable under appropriate circumstances and embodiments of the invention may relate to other sequences than explicitly described or illustrated herein.

Spatial references, such as top, bottom, on, under and the like, in the description and/or in the claims are used for descriptive purposes and not necessarily only for describing relative positions. It shall be clear that embodiments may relate to other positional arrangements of elements described using such spatial references, unless the relative positioning would be necessary for achieving the desired technical effect, i.e. for solving the underlying objective technical problem, as would be evident to the skilled person. Therefore, it is clear that such terms are interchangeable under appropriate circumstances and that embodiments of the present invention may be capable of operation in other orientations than described or illustrated herein.

In this detailed description, various specific details are presented. Embodiments of the present invention can be carried out without these specific details. Furthermore, well-known features, elements and/or steps are not necessarily described in detail for the sake of clarity and conciseness of the present disclosure.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments. References to "embodiments" or "in embodiments" are to be interpreted in the same way.

When the wording horizontal direction is used, it can be construed as a direction parallel with the support surface the animals stand on for weighing, of the device for monitoring the weight of animals according to the present disclosure. Generally, when the device is in use, a horizontal direction is parallel with the floor of the animal housing facility where the device is being used. When the wording vertical direction is used, it can be construed as a direction perpendicular to the horizontal direction, i.e. a direction perpendicular to the support surface the animals stand on for weighing. Generally, when the device is in use, a vertical direction is perpendicular to the floor of the animal housing facility where the device is being used.

Various features of the invention may be grouped together in a single embodiment, figure, or description thereof for the purpose of streamlining the disclosure and aiding in the understanding of inventive aspects. This is not to be interpreted as reflecting an intention that the claimed invention requires more features than are expressly recited in each claim. Rather, as the following claims reflect, inventive aspects may lie in less than all features of a single foregoing disclosed embodiment as explicitly described in the description. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In a first aspect, the present invention relates to a device for monitoring the weight of animals in an animal housing facility, such as a barn or a coop. This monitoring can be done automatically. The animals may refer to animals that typically weigh less than 20 kg, e.g. less than 17.5 kg, e.g. less than 15 kg, e.g. less than 10 kg, e.g. less than 5 kg. The animals may refer to animals that typically have a volume that is less than 20 $dm^3$, e.g. less than 17.5 $dm^3$, e.g. less than 15 $dm^3$, e.g. less than 10 $dm^3$, e.g. less than 5 $dm^3$. The animals may be poultry. For example, the animals may refer to turkeys, ducks, geese and/or chickens. The animal housing facility may be a barn, a coop, a poultry house, e.g. a chicken house, and/or an industrial animal farming building. The animal housing facility may be adapted for housing and/or raising the animals. The animals may be farmed for fur, meat or egg production. The animal housing facility (further also referred to as "shed") may be, for example, suitable for housing (simultaneously) at least 1,000 of the animals, for example at least 10,000 of the animals.

Referring to FIG. 1, a device 1 in accordance with embodiments of the present invention is shown.

The device 1 comprises a support surface 2, e.g. a support structure, configured so that at least one of the animals 10 can stand on the support surface, in operation of the device.

The support surface may be adapted such that a plurality of the animals, e.g. fowls, can stand on the support surface. The weighing of individual animals can nonetheless be achieved by analyzing weight/force fluctuations registered by the force sensor 3. This can be processed automatically.

The device comprises a force sensor 3, e.g. a load cell, connected to or attached to the support surface 2, adapted for measuring a force indicative of a weight of the animal or animals on the support surface. This can be done automatically.

In an operational configuration for weighing animals, the support surface may be positioned at a predetermined level above the ground, e.g. at a distance d from the ground.

The device may comprise a lifting actuator 4 for lowering and raising the support surface 2. This lifting and lowering can be done automatically.

It is an advantage that, by raising the support surface, e.g. by at least a meter, preferably more, above the floor, it can easily travel through even a dense animal herd. This lifting actuator is adapted for lowering the support surface to a predetermined level above the ground for performing weight measurements, e.g. to a distance d from the floor, or to any intermediate level between an upper position and the predetermined level above the ground. These movements can be done automatically.

The upper position is at least 50 cm above ground level, preferably at least 1 m above ground level, even more preferred at least 1.5 m above ground level, e.g. at least 2 m above ground level. The distance d is preferably in the range of 1 cm to 20 cm, e.g. in the range of 1.5 cm to 10 cm, e.g. in the range of 2 cm to 8 cm, e.g. in the range of 3 cm to 6 cm, e.g. 4 cm or 5 cm.

It is an advantage that the device can approach the ground level without touching the ground, thereby reducing the risk that possible diseases spread from one part of the animal housing facility to another part. By travelling between different locations in the animal housing facility in a position that is (relatively) high above the ground level, the risk of frightening the animals can also be reduced.

For example, the force sensor, e.g. the load cell, may be mechanically coupled to an actuatable point of the lifting actuator 4, i.e. such that the load cell can be raised and lowered by the lifting actuator, and, may also be mechanically coupled to the support surface 2, in such manner that a force between the point where the force sensor is connected to or attached to the lifting actuator and a point where the force sensor is connected to or attached to the support surface can be transduced into a signal, e.g. a signal indicative of the force of gravity exerted by the support surface and any load placed on the support surface, such as one or more of the animals.

The lifting actuator 4 may comprise a cable lift, a winch and/or hoist. The lifting actuator 4 may comprise a telescopic arm, a scissor lift, a spiral lift, a zip mast, a telescopic lift and/or combinations thereof. It is an advantage of a telescopic arm, a scissor lift and similar lifting actuators that, unlike a winching mechanism using a rope, a cable or a chain, these lifting actuators may be substantially rigid, e.g. may not be subject to bending and/or flexing. Thus, imparting a horizontally oriented or substantially horizontally oriented momentum, e.g. due to an animal jumping onto the support surface, is less likely to cause swinging motion that could affect the accuracy of the measurement or even a risk of harming animals in the vicinity. However, winching mechanisms and the like are not necessarily excluded in embodiments of the present invention. For example, a stabilizing weight may be included at the free end of the winching mechanism, e.g. substantially where the lifting actuator may be connected to or attached to the force sensor, such that the inertia of the suspended structure is substantially increased. For example, such stabilizing weight may be dimensioned such that the momentum of one or more of the animals jumping onto the support surface does not cause a undesirable pendulum motion of the suspended structure, or at least not a velocity of swinging sideways that is greater than a predetermined threshold.

Furthermore, the lifting actuator 4 may comprise an articulated robot arm, e.g. such as to provide movement in other directions (by translation and/or rotation) than only the vertical direction. It is an advantage of such articulated robot arm that a more precise control over where the support platform is positioned in the animal housing facility can be achieved. For example, when an obstruction is detected, e.g. an animal, straight below the support platform, the articulated robot arm may displace the support platform in a horizontal direction such as to clear the way for further lowering the support surface to the predetermined level above the ground for performing weight measurements, e.g. to the distance d from the floor. This detection of an obstructions and actions to avoid it can be done automatically. Robots that travel on the floor are not included in this invention.

The device 1 may comprise an animal presence sensor 7 to detect the presence of an animal below, e.g. straight below, the support surface 2. This can be done automatically.

For example, such sensor may comprise a camera to detect the animal by image analysis (e.g. performed by the processor 6, (which can be part of the controller such as the on-board controller)), a light detector to detect a light obscuring presence of an animal below the support, a heat detector, a wave reflection detector, such as an echographic detector, a radar, a lidar, a light source and light detector to detect the reflected light, a light gate (e.g. arranged in a horizontal orientation a short distance below the support surface, a contact sensor (e.g. contact pressure sensor), and/or any other means known in the art that is suitable for detecting the presence of an animal. This detection can be done automatically.

The device 1 can comprise a rail system actuator 5 that is mechanically connected to the support surface 2, e.g. via the force sensor 3, e.g. via the lifting actuator 4 and the force sensor 3. The rail system actuator 5 is adapted for suspending the device 1 from a rail or track of a rail system 11 and to propel the device 1 along the rail or track when operably attached thereto (and receiving a suitable control signal for activating the rail system actuator). The rail system 11 may typically comprise one or more tracks or rails that are attached to a wall(s) and/or ceiling of the animal housing facility, such as to allow devices to travel through the building using rail system actuators that are operably engaged with the rail system.

The device 1 comprises a processor 6. The processor 6 (which can be part of the controller such as the on-board controller) is not necessarily limited to a general purpose processor (e.g. adapted for executing a program code), such as a central processing unit, a graphics processing unit, a cell processor, and the like, but may equally refer to an application-specific integrated circuit or configurable hardware, such as a field-programmable gate array.

The processor 6 (which can be part of the controller such as the on-board controller) is adapted for receiving a signal from the force sensor 3 indicative of a weight of the animal or animals on the support surface. The signal is sampled repeatedly, e.g. at a sampling rate of at least once per minute, preferably at least every 20 s, even move preferred at least every 5 s, e.g. at a sampling in the range of 0.5 Hz to 1 kHz, e.g. in the range of 1 Hz to 100 Hz, e.g. 10 Hz. This sampling can be done automatically.

For example, the support surface 2 may be adapted for supporting a plurality of animals, e.g. fowls, at the same time. The processor 6 (which can be part of the controller such as the on-board controller) may be adapted to analyze fluctuations of the signal over time, thus detecting force fluctuations caused by animals stepping onto or off the support surface, and/or comparing the changes in the signal to a predetermined range of typical forces due to weight of animals. The predetermined range may be selected, e.g. by the processor, (which can be part of the controller such as the on-board controller) by taking the type of animal and the age of the animals into account. The predetermined range may also be determined on the basis of pre-stored weight data, e.g. statistic centrality and/or dispersion measures applied to the weight measurements already collected. When a change of the force sensor signal is detected that is within such a range, the change is determined as a weight measurement of an individual animal. Thus, weight measurements of individual animals can be achieved by comparing changes in the force sensor signal. When the change in the force sensor signal represents a weight change in the fowls on the support surface, which is within a predetermined range, the change in the weight force of a single fowl is stored by the evaluation unit. These functions can be done automatically.

Alternatively, the support surface may be dimensioned such as to be able to accommodate only a single animal at a given time, and the measurement of the weight of an individual animal can be determined in a straightforward manner. However, even in such case, the processor (which can be part of the controller such as the on-board controller) may be adapted to compare the received force sensor signal to a predetermined range that is indicative of the weight force of an animal, e.g. the predetermined range referred to hereinabove. Thus, it is possible to ascertain whether the animal is disposed entirely on the support surface, such that the full weight of the animal is registered. This determination can be done automatically.

The processor 6 (which can be part of the controller such as the on-board controller) may be adapted for storing in a memory 9 a plurality of weight measurements of individual animals.

The processor 6 (which can be part of the controller such as the on-board controller) may be adapted for communicating, using a communication module 8, the weight measurement of an individual animal or a plurality of such weight measurements to a receiver, e.g. a computer. The communication module may be a wired interface, such as an Ethernet network interface or a universal serial bus interface, or a wireless data communication module, such as a WiFi module, a Bluetooth module, a GPRS module, and the like. This communication can be done automatically and/or continuously.

The processor 6 (which can be part of the controller such as the on-board controller) is adapted for controlling the rail system actuator 5, to move the actuator to a target position in the animal housing facility. This control of movements can be done automatically.

The processor 6 (which can be part of the controller such as the on-board controller) may be adapted for determining the target position for moving the rail system actuator to, e.g. by receiving instructions and/or coordinates via the communication module 8. The processor 6 (which can be part of the controller such as the on-board controller) may also be adapted to determine the target position using a random or quasi-random number generator, e.g. by randomly sampling locations in the animal housing facility. The processor 6 (which can be part of the controller such as the on-board controller) may also be adapted for periodically moving the rail system actuator to a next position, in which the positions are predefined. For example, a sequence of target positions may be stored in memory 9, or a fixed distance may be moved along the track in each step between the positions. The processor (which can be part of the controller such as the on-board controller) may also comprise a timer to determine the time spent at a position collecting weight data, and to initiate the movement to a next target position when the timer exceeds a predetermined interval. This starting and stopping of movement can be done automatically.

Since mobility of the animals in the housing facility may be too low to ensure a good sampling of the population when the device remains stationary, it is an advantage of embodiments of the present invention that a good sampling of the population housed in the building can be achieved by moving the support surface 2 for weighing the animals through the animal housing facility. For example, a pathway around the building can be preprogrammed in the device, e.g. for use by the processor 6 (which can be part of the controller such as the on-board controller).

For example, the rail system actuator 5 may be controlled to move at a very slow speed through the facility, e.g. to continuously move at a very slow speed. This 'very slow speed' may be a speed that is sufficiently low such that the movement is substantially imperceptible to the animals. For example, this speed may be a speed in the range of 1 mm per hour to 1 m per hour, e.g. in the range of 1 cm per hour to 20 cm per hour, e.g. in the range of 5 cm per hour to 10 cm per hour.

However, in advantageous embodiments, the device may comprise a lifting actuator 4, and the processor 6 (which can be part of the controller such as the on-board controller) may be adapted for controlling the lifting actuator 4 to raise the support surface 2 before controlling the rail system actuator 5 to move to the target position, and controlling the lifting actuator 4 to lower the support surface 2 after the target position has been reached. This lifting and lowering can be done automatically. It is an advantage that the weighing device can be moved at speed throughout the facility from one sampling location to another.

In a device in accordance with embodiments of the present invention, the processor (which can be part of the controller such as the on-board controller) may be adapted to detect the presence of an animal below the support surface 2 using the animal presence sensor 7, while lowering the support surface using the lifting actuator 4. This detection can be done automatically. In case the processor (which can be part of the controller such as the on-board controller) detects the presence of an animal, the lowering of the lifting actuator may be halted until the presence of the animal is no longer detected. This halting can be done automatically. Alternatively (or additionally), the rail system actuator may be controlled by the processor (which can be part of the controller such as the on-board controller) to move until the presence of the animal is no longer detected, at which time the lowering of the lifting actuator may be resumed. This actuator control can be done automatically. Additionally or alternatively, the lifting actuator may be adapted to provide movement in more than solely the vertical direction, and may be controlled to move in a horizontal direction until the presence of the animal is no longer detected, at which time the lowering of the support surface is resumed. This control of movement can be done automatically.

In embodiments of the present invention, the device may comprise alerting means 12 to encourage the detected animal to move away from underneath the support surface, e.g. a light source or a sound source. The processor (which can be part of the controller such as the on-board controller) may be configured to activate the alerting means only when the presence of the animal underneath the support surface is detected using the animal presence sensor 7. This alerting can be done automatically.

In a second aspect, the present invention relates to a method for monitoring the weight of animals in an animal housing facility. The animals may be poultry.

Figure 2:
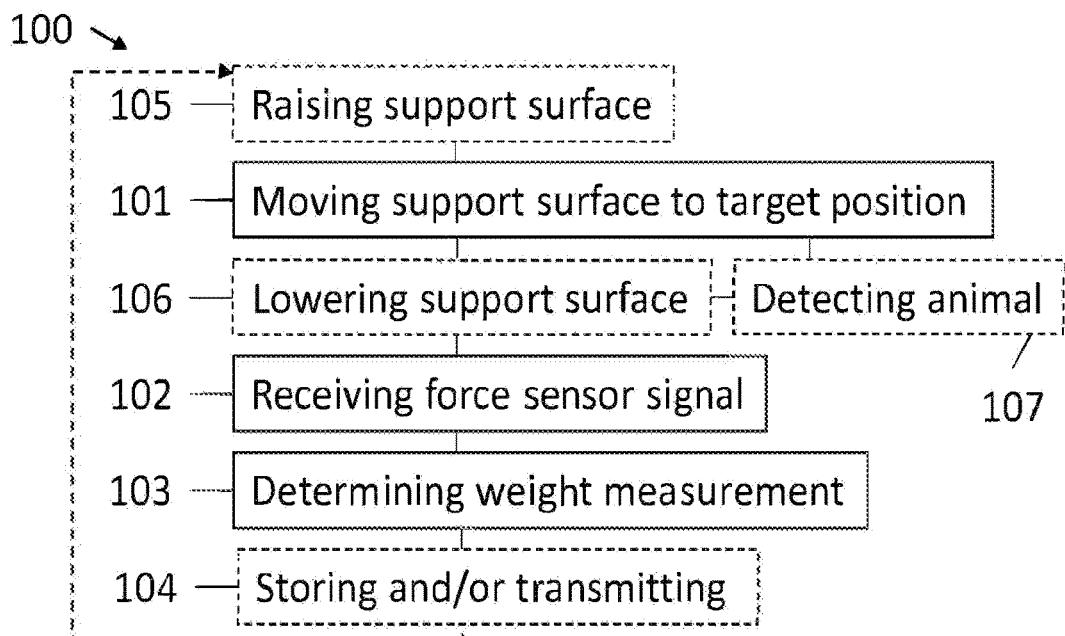
FIG. 2 illustrates a method in accordance with embodiments of the present invention.

FIG. 2 shows a method 100 in accordance with embodiments of the present invention.

The method 100 comprises moving 101 a support surface 2, under the control of a processor 6 (which can be part of the controller such as the on-board controller), to a target position in the animal housing facility along a rail or track, in which the support surface 2 is suitable for at least one of the animals to stand on, e.g. in which the support surface is suspended from the rail or track by a rail system actuator 5 controlled by the processor (which can be part of the controller such as the on-board controller). This control can be done automatically. Such a rail system is disclosed in the international patent application WO 2018/015519 which is incorporated by reference in its entirety. The support surface may be adapted such that a plurality of the animals can stand simultaneously on the support surface.

Moving the support surface may comprise moving the support surface at a substantially constant speed through the facility, in which the speed is substantially imperceptible to the animals. This speed control can be done automatically.

The method may comprise determining the target position to move the rail system actuator to, by receiving instructions and/or coordinates, e.g. via a communication module 8, and/or by randomly sampling locations in the animal housing facility and/or by periodically moving to a next position of a predetermined sequence of positions. This determining of the target position can be done automatically.

The method may comprise raising 105 the support surface 2, e.g. using a lifting actuator 4, e.g. under the control of the processor 6 (which can be part of the controller such as the on-board controller), before moving the support surface to the target position and lowering 106 the support surface 2 when the target position has been reached, e.g. to a predetermined distance d from the ground for performing weight measurements. This movement control can be done automatically.

The method may comprise detecting 107, e.g. by the processor 6 (which can be part of the controller such as the on-board controller), the presence of an animal below the support surface 2, e.g. using an animal presence sensor 7. This detecting can be done automatically.

When the presence of the animal is detected, the lowering 106 of the support surface may be halted until the presence of the animal is no longer detected. This halting and detection can be done automatically.

When the presence of the animal is detected, the support surface 2 may be moved, e.g. in a horizontal direction, out of the way until the presence of the animal is no longer detected. This movement and detection can be done automatically.

When the presence of the animal is detected, the detected animal may be encouraged to move away from underneath the support surface, e.g. using alerting means 12 under the control of the processor 6 (which can be part of the controller such as the on-board controller). This alerting can be done automatically.

The method comprises receiving 102 a signal, by the processor 6 (which can be part of the controller such as the on-board controller), from a force sensor 3 indicative of a weight of the animal or animals on the support surface when the support surface is located at the target position.

Receiving the signal may comprise sampling the signal provided by the force sensor 3 at a predetermined sampling frequency. This sampling can be done automatically.

The method comprises determining 103, by the processor 6 (which can be part of the controller such as the on-board controller), a weight measurement of an individual animal based on said signal. This determining can be done automatically.

Determining the weight measurement may comprise analyzing fluctuations of the signal over time and comparing the signal or temporal changes in the signal to a predetermined range of typical forces due to weight of the animals, in which the weight of individual animals is determined on the basis of the signal or the temporal change of the signal when falling within said predetermined range. These functions can be done automatically.

The method may comprise storing 104, e.g. in a digital memory 9, a plurality of the weight measurements of individual animals, and/or transmitting 104, e.g. using a communication module 8, the weight measurement of an individual animal or a plurality of such weight measurements to a receiver. This can be done automatically.

Other features, or details of the features described hereinabove, of a method in accordance with embodiments of the present invention shall be clear in view of the description provided hereinabove relating to a device in accordance with embodiments of the present invention, and/or vice versa.

Implementation

In accordance with embodiments of the present invention software may be implemented as a computer program product which has been compiled for a processing engine like processor 6 to carry out any of the methods of the present invention or is compiled to execute in an interpretative virtual machine such as the Java™ Virtual Machine running on processor 6. A number or all of software components can be stored in the memory and are executable by the processor 6, e.g. the processor 6 can a component in a controller such as an on-board controller. The term "executable" means a program file that is in a form that can ultimately be run by the processor 6. Examples of executable programs may be, for example, a compiled program that can be translated into machine code in a format that can be loaded into a random access memory and run by the processor 6, or source code that may be expressed in proper format such as object code that is capable of being loaded into a random access memory and executed by the processor 6, or source code that may be interpreted by another executable program to generate instructions in a random access memory to be executed by the processor 6, etc. A device according to embodiments of the present invention may comprise logic encoded in media for performing any step, or steps of the methods according to embodiments of the present invention. Logic may comprise software encoded in a disk or other computer-readable medium and/or instructions encoded in an application specific integrated circuit (ASIC), field programmable gate array (FPGA), or other processor or hardware. A device will also include a CPU and/a GPU and memory, the CPU and/or GPU having a processing engine able to execute software of the present invention.

The computer program product may be stored on a non-transitory signal storage medium such as an optical disk (CD-ROM or DVD-ROM), a digital magnetic tape, a magnetic disk, a solid state memory such as a USB flash memory, a ROM, etc.

The software can be embodied in a computer program product adapted to carry out the following functions when the software is loaded onto the respective device or devices and executed on one or more processing engines such as microprocessors, ASICs, FPGAs etc.:

monitoring the weight of animals in an animal housing facility, which monitoring can be done automatically. The animals may be animals that typically weigh less than 20 kg, e.g. less than 17.5 kg, e.g. less than 15 kg, e.g. less than 10 kg, e.g. less than 5 kg. The animals may refer to animals that typically have a volume that is less than 20 dm$^3$, e.g. less than 17.5 dm$^3$, e.g. less than 15 dm$^3$, e.g. less than 10 dm$^3$, e.g. less than 5 dm$^3$. The animals may be poultry.

The software can be embodied in a computer program product adapted to carry out the following functions when the software is loaded onto the respective device or devices and executed on one or more processing engines such as microprocessors, ASICs, FPGAs etc.:

moving a support surface to a target position in the animal housing facility along a rail or track, whereby such a rail system is disclosed in the international patent application WO2018/015519 which is incorporated by reference in its entirety, receiving a signal from a force sensor indicative of a weight of the animal or animals on the support surface when the support surface is located at the target position, determining a weight measurement of an individual animal based on the signal. This determining can be done automatically, The software can be embodied in a computer program product adapted to carry out the following functions when the software is loaded onto the respective device or devices and executed on one or more processing engines such as microprocessors, ASICs, FPGAs etc.:

moving the support surface at a substantially constant speed through the facility, in which the speed is substantially imperceptible to the animals. This speed control can be done automatically, determining the target position to move the support surface to, by receiving instructions and/or coordinates, e.g. via a communication module, and/or by randomly sampling locations in the animal housing facility and/or by periodically moving to a next position of a predetermined sequence of positions. This sampling and moving can be done automatically, raising the support surface before moving the support surface to the target position and lowering the support surface when the target position has been reached, e.g. to a predetermined distance d from the ground for performing weight measurements. These movements can be done automatically, detecting the presence of an animal below the support surface. This detecting can be done automatically, when the presence of the animal is detected, the lowering of the support surface is halted until the presence of the animal is no longer detected. This halting can be done automatically, when the presence of the animal is detected, the support surface may be moved, e.g. in a horizontal direction, out of the way until the presence of the animal is no longer detected. This movement and detecting can be done automatically, when the presence of the animal is detected, the detected animal may be encouraged to move away from underneath the support surface, e.g. using alerting means. This alerting can be done automatically.

The software can be embodied in a computer program product adapted to carry out the following functions when the software is loaded onto the respective device or devices and executed on one or more processing engines such as microprocessors, ASICs, FPGAs etc.:

receiving the signal can comprise sampling the signal provided by the force sensor at a predetermined sampling frequency. This sampling can be done automatically, determining the weight measurement may comprise analyzing fluctuations of the signal over time and comparing the signal or temporal changes in the signal to a predetermined range of typical forces due to weight of the animals, in which the weight of individual animals is determined on the basis of the signal or the temporal change of the signal when falling within said predetermined range. This analysis can be done automatically, storing, e.g. in a digital memory such as a non-volatile memory, a plurality of the weight measurements of individual animals, and/or transmitting, e.g. using a communication module, the weight measurement of an individual animal or a plurality of such weight measurements to a receiver. This storing can be done automatically.

The software e.g. in the form of a computer product mentioned above can be stored on a non-transitory signal storage medium, such as an optical disk (CD-ROM or DVD-ROM); a magnetic tape, a magnetic disk, a ROM, or a solid state memory such as a USB flash memory or similar.

While the invention has been described hereinabove with reference to a number of embodiments, this is done to illustrate and not to limit the invention, the scope of which is determined by the accompanying claims. The skilled person will appreciate that features disclosed herein in connection with individual embodiments may be combined with features from other embodiments to obtain the same technical effects and advantages, without departing from the scope of the invention.

The invention claimed is:

1. A device for monitoring the weight of animals in an animal housing facility, the device comprising:
   a support surface configured so that at least one of the animals can stand on the support surface, in operation of the device;
   a force sensor, connected to the support surface, for measuring a force indicative of a weight of the animal or animals on the support surface, in operation of the device;
   a rail system actuator for suspending the device from a rail or track of a rail system and to propel the device, when controlled accordingly, along the rail or track when operably attached thereto; and
   a processor,
   wherein the processor is adapted for:
      controlling the rail system actuator to move the actuator to a target position in the animal housing facility;
      receiving a signal from the force sensor indicative of a weight of the animal or animals on the support surface when the support surface is located at the target position; and
      determining a weight measurement of an individual animal based on the signal.

2. The device of claim 1, wherein the processor is adapted for receiving the signal by sampling the signal provided by the force sensor at a predetermined sampling frequency.

3. The device of claim 2, wherein the processor is adapted for analyzing fluctuations of the signal over time and comparing the signal or temporal changes in the signal to a predetermined range of typical forces due to weight of the animals, in which the weight of individual animals is determined on the basis of the signal or the temporal change of the signal when falling within the predetermined range.

4. The device of claim 1, comprising a memory, and wherein the processor is adapted for storing a plurality of the weight measurements of individual animals in the memory.

5. The device of claim 1, further comprising a communication module.

6. The device of claim 5, wherein the processor is adapted for communicating the weight measurement of an individual animal or a plurality of such weight measurements to a receiver using the communication module.

7. The device of claim 5, wherein the processor is adapted for determining the target position to move the rail system actuator based on instructions and/or coordinates received via the communication module.

8. The device of claim 1, wherein the processor is adapted for determining the target position to move the rail system actuator by randomly sampling locations in the animal housing facility and/or by periodically moving the rail system actuator to a next position of a predetermined sequence of positions.

9. The device of claim 1, wherein the animals are poultry.

10. The device of claim 1, wherein the support surface is adapted such that a plurality of the animals can stand simultaneously on the support surface.

11. The device of claim 1, wherein the processor is adapted for controlling the rail system actuator to move at a constant speed through the facility, and wherein the constant speed is a speed in a range of 1 mm per hour to 1 m per hour.

12. The device of claim 1, comprising a lifting actuator for lowering and raising the support surface.

13. The device of claim 12, wherein the lifting actuator is adapted for lowering the support surface to a predetermined distance (d) from the ground for performing weight measurements and for raising the support surface to an upper position for travelling through the animal housing facility.

14. The device of claim 12, wherein the lifting actuator comprises a telescopic arm, a telescopic lift, a scissor lift and/or combinations thereof.

15. The device of claim 12, wherein the processor is adapted for controlling the lifting actuator to raise the support surface before controlling the rail system actuator to move to the target position, and controlling the lifting actuator to lower the support surface after the target position has been reached.

16. The device of claim 15, comprising an animal presence sensor to detect the presence of an animal below the support surface.

17. The device of claim 16, wherein the processor is adapted to detect the presence, using the animal presence sensor, of an animal below the support surface while lowering the support surface, and, when the presence of an animal is detected, performing one or more of the following actions:
   halting the lowering of the lifting actuator until the presence of the animal is no longer detected;
   controlling the rail system actuator to move until the presence of the animal is no longer detected;
   moving the lifting actuator in a horizontal direction until the presence of on animal is no longer detected; and
   activating alerting means to encourage the detected animal to move away from underneath the support surface.

18. A method for monitoring the weight of animals in an animal housing facility comprising:
   moving a support surface to a target position in the animal housing facility along a rail or track, wherein the support surface is suitable for at least one of the animals to stand on;
   receiving a signal from a force sensor indicative of a weight of the animal or animals on the support surface when the support surface is located at the target position; and
   determining a weight measurement of an individual animal based on the signal.

19. The method of claim 18, further comprising:
   when the target position is reached, lowering the support surface to a predetermined distance (d) from the ground for performing weight measurements,
   raising the support surface to an upper position for travelling through the animal housing facility.

20. The method of claim 19, comprising:
using an animal presence sensor to detect a presence of an animal below the support surface while lowering the support surface.

21. The method of claim 20, comprising:
when the presence of an animal is detected while lowering the support surface, performing one or more of the following actions:
- halting the lowering of support plate until the presence of the animal is no longer detected;
- moving the support plate in a horizontal direction until the presence of on animal is no longer detected; and
- activating alerting means to encourage the detected animal to move away from underneath the support surface.

* * * * *